US011762740B2

(12) United States Patent
Karasev et al.

(10) Patent No.: US 11,762,740 B2
(45) Date of Patent: *Sep. 19, 2023

(54) SYSTEMS AND METHODS FOR EFFICIENT BACKUP RESTORATION

(71) Applicant: Acronis International GmbH, Schaffhausen (CH)

(72) Inventors: Vadim Karasev, Moscow (RU); Vasily Semyonov, Moscow (RU); Stanislav Protasov, Singapore (SG); Oleg Shaikhatarov, Moscow (RU); Serguei Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/210,583

(22) Filed: Mar. 24, 2021

(65) Prior Publication Data
US 2021/0208981 A1 Jul. 8, 2021

Related U.S. Application Data

(63) Continuation of application No. 15/892,958, filed on Feb. 9, 2018, now Pat. No. 10,990,485.

(51) Int. Cl.
*G06F 11/14* (2006.01)
*G06F 9/455* (2018.01)

(52) U.S. Cl.
CPC ...... *G06F 11/1469* (2013.01); *G06F 9/45558* (2013.01); *G06F 2009/45562* (2013.01);
(Continued)

(58) Field of Classification Search
CPC ............. G06F 11/1469; G06F 11/1438; G06F 11/1484; G06F 9/45558;
(Continued)

(56) References Cited

U.S. PATENT DOCUMENTS 7,093,086 B1 * 8/2006 van Rietschote ... G06F 11/1438
714/13
7,334,157 B1 * 2/2008 Graf ...................... G06F 9/4411
714/E11.122

(Continued)

OTHER PUBLICATIONS

Svärd, Petter, et al. "Evaluation of delta compression techniques for efficient live migration of large virtual machines." Proceedings of the 7th ACM SIGPLAN/SIGOPS international conference on Virtual execution environments. 2011. (Year: 2011).*

*Primary Examiner* — Dennis Truong
(74) *Attorney, Agent, or Firm* — ArentFox Schiff LLP; Michael Fainberg

(57) ABSTRACT

Disclosed are systems and methods restoring a computing system. The described method includes emulating a virtual disk using a backup of the computing device and generating an ancillary virtual machine (VM). The method includes determining and writing, to a delta disk linked to the virtual disk, configuration modifications to the ancillary VM that enable booting of the ancillary VM using the virtual disk on a different device with dissimilar hardware as the computing device. Responsive to receiving a request to perform recovery of the computing device, the method comprises restoring the backup by creating on the different device a recovery virtual machine (VM) having a base virtual disk emulated from the backup, and modifying the recovery VM by attaching the delta disk having the configuration modifications.

20 Claims, 7 Drawing Sheets

(52) U.S. Cl.
CPC .............. *G06F 2009/45583* (2013.01); *G06F 2201/815* (2013.01)

(58) Field of Classification Search
CPC . G06F 2009/45562; G06F 2009/45583; G06F 2009/45575; G06F 2201/815
See application file for complete search history.

(56) References Cited

U.S. PATENT DOCUMENTS

| | | | |
|---|---|---|---|
| 7,356,679 B1* | 4/2008 | Le | G06F 16/10 713/1 |
| 7,533,229 B1* | 5/2009 | van Rietschote | G06F 11/1438 711/161 |
| 8,156,301 B1* | 4/2012 | Khandelwal | G06F 9/45533 711/146 |
| 8,370,835 B2* | 2/2013 | Dittmer | G06F 9/45558 718/1 |
| 9,965,357 B1* | 5/2018 | Earl | G06F 11/203 |
| 10,061,660 B1* | 8/2018 | Jagannatha | G06F 11/1464 |
| 10,114,705 B1* | 10/2018 | Kumar | G06F 11/1469 |
| 10,915,347 B1* | 2/2021 | Per | G06F 9/45558 |
| 2008/0244028 A1* | 10/2008 | Le | G06F 3/0607 713/1 |
| 2009/0249335 A1* | 10/2009 | Vasilevsky | G06F 9/45533 718/1 |
| 2010/0235831 A1* | 9/2010 | Dittmer | G06F 9/45558 718/1 |
| 2011/0055299 A1* | 3/2011 | Phillips | G06F 9/45533 707/827 |
| 2011/0138383 A1* | 6/2011 | Le | G06F 9/5077 718/1 |
| 2012/0254119 A1* | 10/2012 | Kumarasamy | G06F 11/1464 707/646 |
| 2012/0265959 A1* | 10/2012 | Le | G06F 16/188 711/E12.103 |
| 2012/0297181 A1* | 11/2012 | Lee | G06F 8/658 713/2 |
| 2014/0006858 A1* | 1/2014 | Helfman | G06F 11/1448 714/19 |
| 2014/0059688 A1* | 2/2014 | Margalit | G06F 21/561 726/24 |
| 2014/0365822 A1* | 12/2014 | Tarves, Jr. | G06F 11/1415 714/15 |
| 2015/0040127 A1* | 2/2015 | Dippenaar | G06F 9/4856 718/1 |
| 2015/0089172 A1* | 3/2015 | Kulkarni | G06F 9/452 711/162 |
| 2015/0178108 A1* | 6/2015 | Tarasuk-Levin | G06F 9/45558 718/1 |
| 2015/0277952 A1* | 10/2015 | Lin | G06F 9/45558 711/114 |
| 2015/0324217 A1* | 11/2015 | Shilmover | G06F 9/45558 718/1 |
| 2015/0347430 A1* | 12/2015 | Ghosh | G06F 11/1451 707/649 |
| 2015/0378766 A1* | 12/2015 | Beveridge | G06F 9/45558 718/1 |
| 2016/0308722 A1* | 10/2016 | Kumarasamy | H04L 67/561 |
| 2018/0060104 A1* | 3/2018 | Tarasuk-Levin | G06F 9/4856 |
| 2019/0065323 A1* | 2/2019 | Dhamdhere | G06F 11/1484 |

* cited by examiner

SYSTEMS AND METHODS FOR EFFICIENT BACKUP RESTORATION

CROSS-REFERENCE TO RELATED APPLICATIONS

This application is a continuation of U.S. Non-Provisional application Ser. No. 15/892,958 filed Feb. 9, 2018, which is herein incorporated by reference.

FIELD OF TECHNOLOGY

The present disclosure relates generally to the field of data backup and recovery, more specifically, to systems and methods of disaster recovery of computing resource using data backups.

BACKGROUND

Disaster recovery is a field within computing relating to tools, policies, and procedures that enable recovery or continuation of vital technology, infrastructure, and systems. For example, a given disaster recovery policy may specify a recovery point objective (RPO), which is the maximum time period in which data might be lost from an information technology (IT) service due to a disruption or incident. A disaster recover policy may also specify a recovery time objective (RTO), which refers to a targeted duration of time and a service level within which a business or technological process must be restored after a disruption ("disaster") occurs in order to avoid unacceptable consequences associated with a break in business continuity.

However, using conventional tools, the time spent to recover backup data and resume operations with a significant amount of data could be huge. Recovery time can depend on a particular machine workload and on the target hardware configuration for scenarios when recovery is performed onto a different hardware platform having different types of hardware devices than the original computing hardware. A large portion of the recovery time can be spent on copying or preparing backups. Even if this recovery time may be on the order of several minutes, such a delay is still unacceptable for certain business-critical applications where the recovery time objective is high.

For example, with a transfer rate up to 100 Megabytes per second over a network, it would take approximately 1,000 seconds to transfer all the data from the backup storage to the server as local storage. This assumes that the entire network bandwidth is available for this process. Frequently, this is not the case, since only a fraction of the bandwidth may actually be available at any given time for restoring the files from backup. In practice, such transfers of data from backup to the server can take many hours. Also, even 1,000 seconds of downtime is an extremely long time, particularly for many mission-critical applications. For example, if the server in question is a web server that handles customer requests or sales, a period of 16-20 minutes of downtime can result in substantial lost sales. Furthermore, it is generally believed that for many e-commerce applications, the consumer attention span is relatively short, and a customer that does not receive a rapid response from a web server will simply go to a competitor's website.

In other words, there is a need in the art to minimize server downtime during backup, avoid network overloading during the restoration process, and to provide a mechanism to rapidly recover a server after a failure or shutdown.

SUMMARY

Accordingly, a system and method is disclosed herein for backing up and restoring a computing device, and more particularly, for creating data backups that facilitate a rapid disaster recovery system. To minimize the RTO, the described technique may execute specific data processing algorithms needed for preparing a recovery version of a computing system to start on new hardware before the actual recovery is required. These preparations may be made after, or in response to, backup creation. The prepared backups are then ready to use at the time when actual recovery is executed, thus effectively minimizing the time between making the decision to restore data and completed recovery and having the protected applications running. The described technique involves generating special datasets with results of recovery algorithms (e.g., dissimilar-hardware restore processes) applied to backups as background activity, and saving this data as a virtual delta-disk (e.g., in high-speed storage). At recovery time, the described technique applies the saved delta-disks to a new recovery virtual machine.

According to an exemplary aspect, a computer-implemented method for restoring a computing system is provided. The method includes receiving a delta disk that was generated based on a backup of a computing device executing a protected application. The delta disk may include one or more configurations for executing the protected application on a different device than the computing device. The method further includes, responsive to receiving a request to perform recovery of the computing device, creating a recovery virtual machine (VM) having a base virtual disk emulated from the backup, modifying the recovery VM by attaching the delta disk having the one or more configurations for executing the protected application, and resuming execution of the protected application on the recovery VM.

In another aspect, modifying the recovery VM by attaching the delta disk further includes creating a delta disk chain comprising the base virtual disk of the recovery VM as a parent disk, and the delta disk as a child disk of the base virtual disk.

In another aspect, wherein, prior to receiving the request to perform the recovery of the computing device, the delta disk was generated by a restore-preparation process that includes: receiving the backup of the computing device executing the protected application, generating an ancillary virtual machine (VM) based on the backup, wherein the ancillary VM includes a virtual disk that is emulated from the backup, generating the delta disk linked to the virtual disk of the ancillary VM, modifying the ancillary VM to boot using the virtual disk that is emulated from the backup, wherein modifications to the ancillary VM is saved to the delta disk, and saving the delta disk to a data store.

In another aspect, the restore-preparation process is performed by background processing that is off-site from a backup system that created the backup of the computing device.

In another aspect, the restore-preparation process comprises a dissimilar hardware restoration process configured to reconcile at least one difference between hardware of the computing device and virtual hardware of the ancillary VM.

In another aspect, the restore-preparation process modifies at least one device driver in the virtual disk of the ancillary VM associated with the backup.

In another aspect, the delta disk associated with the backup occupies less storage space than a virtual disk file associated with a virtual machine converted from the backup.

According to another exemplary aspect, a system for restoring a computing system is provided. The system includes a storage device, and a hardware processor. The hardware processor is configured to receive a delta disk that was generated based on a backup of a computing device executing a protected application. The delta disk includes one or more configurations for executing the protected application on a different device than the computing device. The hardware processor is further configured to, responsive to receiving a request to perform recovery of the computing device, create a recovery virtual machine (VM) having a base virtual disk emulated from the backup, modify the recovery VM by attaching the delta disk having the one or more configurations for executing the protected application, and resume execution of the protected application on the recovery VM.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for restoring a computing system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
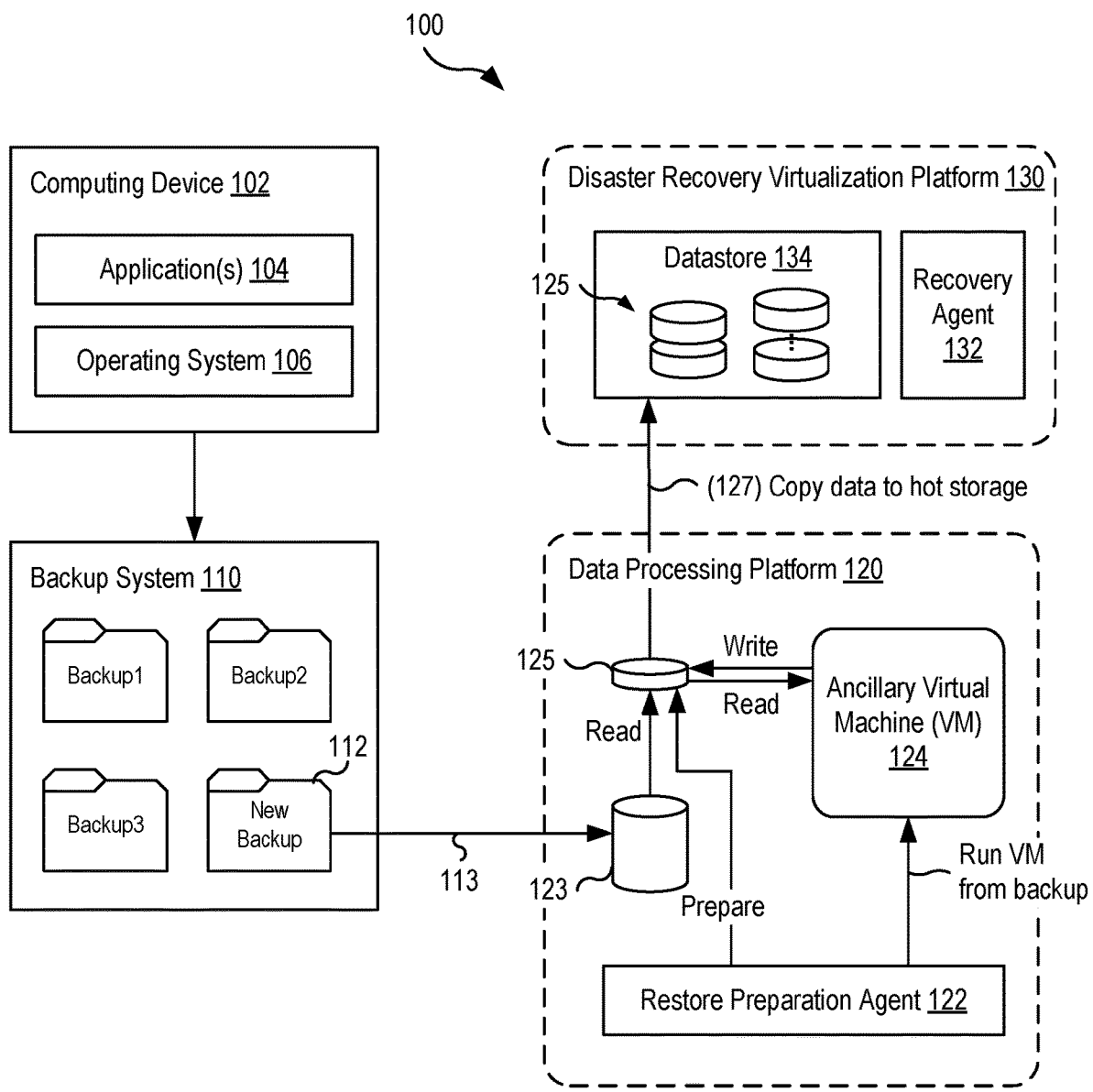
FIGS. 1A and 1B are block diagrams illustrating a system for restoring a computing system according to an exemplary aspect.
Figure 1B:
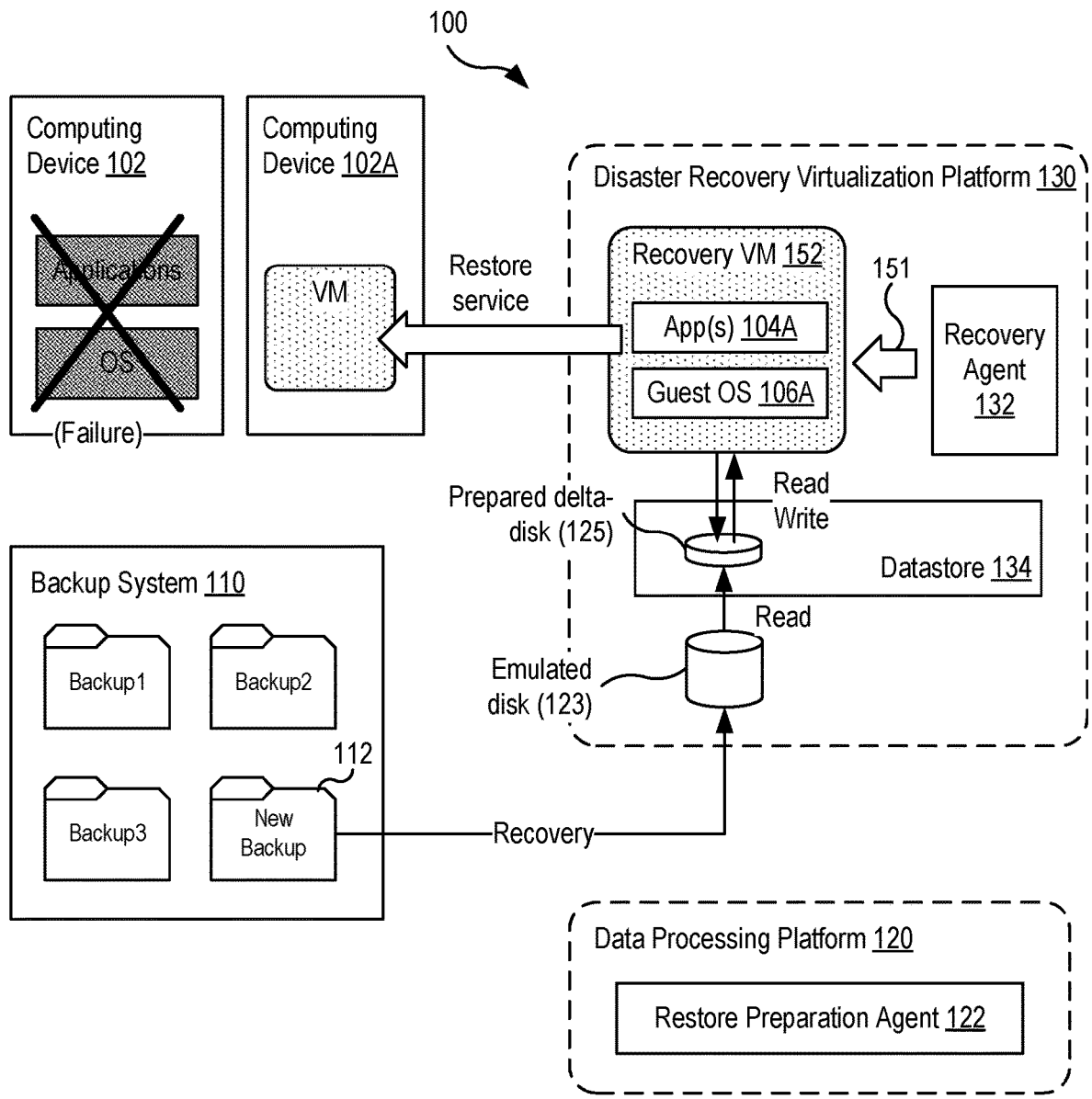

FIGS. 1A and 1B are block diagrams illustrating a system 100 for restoring a computing system according to an exemplary aspect. The system 100 includes a computing device 102 whose user data is backed up by a backup system 110. The computing device 102 may be executing a workload including at least one application 104 on an operating system 106. In some aspects, at least one of the applications 104 may be designated as a "protected" application subject to a disaster recovery policy implemented by a disaster recovery virtualization platform 130. The application 104 may include program data files of the application 104 as well as user data associated with the application, which taken together represent an execution state of the application. In some aspects, the application 104 may have a multi-tier software architecture in which user data of the application is stored in a data layer. In other aspects, the computing device 102 itself may be designated with "protected" status, which would then protect all processing performed by the computing device 102, which includes the entire software stack of the computing device 102.

The backup system 110 is configured to store a plurality of backups 112 of the computing device. In some aspects, the backups 112 may be generated by the backup system 110 itself, or in other aspects, may be created by a local backup agent (not shown) executing on the computing device 102. The backup system 110 may be a storage system having any number of storage servers or set of disks (e.g., hard disk drives), which are managed by software for archiving and storing data.

A backup 112 (also referred to herein as a backup archive) includes a copy of files, folders, data, meta-data, and/or information stored on a disk (of the computing device). In one aspect, a backup 112 may be a sector-by-sector copy of a disk, including a copy of the operating system 106, registry, drivers, data files of software applications 104, all files and folders (including hidden and system files), boot record, file allocation tables (FAT), and other system data. Such backups 112 may also be referred to as a disk image (which may further include a master boot record, or MBR) or a partition image. In some aspects, the backups 112 may be stored in a particular format for compression and/or packaging, such as a True Image Backup™ format (*.tib) made available by Acronis®, ISO images, VHD files, and other file formats.

The backup system 110 may be configured to perform a backup and archival procedure at the direction of a user (e.g., user input) or periodically according to a schedule determined by a disaster recovery policy. For example, in compliance with a policy specifying a RPO of 24 hours, the backup system 110 may be configured to create a full backup of the computing device 102 every day at 2:00 AM.

In some aspects, the backups 112 may be "full" backups having a replica of the entirety of a system disk, volume, partition, or other data storage of the computing device 102. In some cases, the backup system may generate incremental backups which contains all changes that have been made since the latest incremental or full backup was created. In other cases, the backup system may generate differential backups which contain all changes that have been after a full backup creation (i.e., cannot be chained to another differential or incremental backup). The backup system may generate a full backup based on a prior full backup and at least one incremental/differential backup by collapsing the backups into a single backup file.

In one aspect, the system 100 further includes a data processing platform 120 and a disaster recovery virtualization platform 130. The disaster recovery virtualization platform 130 may be configured to perform disaster recovery or failover for any applications (e.g., application 104) or computing device designated as "protected" according to one or more disaster recovery policies. It is noted that the described operations of the disaster recovery virtualization platform 130 may be extended to cover similar site reliability engineering operations, such as high-availability servers or fault tolerant infrastructure. While depicted as separately, it is understood that in some aspects, the operations and/or functionality of the various modules executing in the platforms may be combined into a single platform or re-distributed into other configurations.

The disaster recovery virtualization platform 130 may include a recovery agent 132 and a data store 134 for storing virtual disks associated with disaster recovery. The data processing platform 120 is configured to perform its preparation operations in the "background", i.e., concurrently with operations of the application 104 and the backup operations of the backup system 110, and in some cases, in a different priority (e.g., lower) than those operations. In some aspects, the data processing platform may be an off-site system relative to the computing device 102 and backup system 110, for example, executing on separate physical servers in another data center.

One approach to disaster recovery is referred to herein as "convert to VM", and includes the conversion of a backup into a virtual machine disk, which is then stored in a failover or recovery system. Under this approach, the RTO is decreased significantly since the converted VM is ready-to-use instantly after the initial conversion from backup archive into VM is performed. That is, at the time when a user needs to failover to this converted VM, all they have to do is power this VM on. The drawback of this approach is the high storage space requirements and costs resulting from the fact that the converted VM (with its associated VM disk files) occupy storage space, even while the converted VM is not in use.

Another approach to disaster recovery is referred to herein as "run VM from archive", and includes emulating a virtual disk using a backup archive. Sometimes referred to as "mounting" a VM, the advantage of this process is that it does not consume additional storage resources during recovery (since the data is read directly from the backup archive). However, in order to start the guest OS of such a mounted VM, additional restore algorithms must be executed at the restore time. Applying these restore algorithms may take significant time, since the VM disks are emulated from the backup archive, and thus have limited TOPS (input/output operations per second), which further slows down application of the restore algorithms. As a result, the time between making the decision to restore and completed recovery is greater than in the "convert to VM" approach described above.

Accordingly to an aspect of the present disclosure, the data processing platform 120 and the disaster recovery virtualization platform 130 are configured to reduce the recovery time objective (RTO) using the run-VM-from-archive approach by executing a recovery-preparation step in advance (of initiating any recovery process). As a result, at the time a decision-to-restore is made, a guest OS of a mounted VM may be started without having to first execute any recovery preparation steps. Thus, aspects of the present disclosure provide advantages from both of the above-described approaches: a minimal RTO is enabled, while consuming little additional storage space (i.e., less than a size of an entire copy of a full backup archive). The RTO of a "run VM from archive" approach can be comparable to the RTO using the "convert to VM" approach, even without excessive storage space consumption. This may be done by storing the recovery preparation results in a special virtual delta disk which can be instantly applied to a "mounted" VM by a hypervisor without the need to create this data at the time of recovery. In some examples, even though a backup archive may be on the order of multiple gigabytes (GBs) or terabytes (TBs), the size of this virtual delta disk can be a flat value, ranging from 100 MB to 300 MB. It is noted that this size of the virtual delta disk is much less storage space than taken by the convert-to-VM approach, which creates a virtual disk requiring storage space of at least a same size or greater than the backup archive in addition to the backup archive itself (i.e., GBs or TBs).

In one aspect, the data processing platform 120 includes a restore-preparation agent 122 configured to generate a delta disk 125 based on a backup 112 of the computing device 102 executing a protected application 104. As described in greater detail below, the delta disk 125 may contain restore-preparation data, which are configuration files, data files, drivers, library files, and other data needed for executing the protected application 104 on a different device than the computing device 102.

To form the restore-preparation delta disk 125, the restore-preparation agent 122 may receive (e.g., from the backup system 110) a backup of the computing device 102 having the protected application 104 running thereon (denoted by 113). The restore-preparation agent 122 may use a temporary or ancillary VM 124 that uses the backup 112 as an emulated disk 123. The restore-preparation agent 122 executes full stack recovery algorithms, including dissimilar hardware restore algorithms, within the ancillary VM 124 (i.e., as if the ancillary VM were to be an actual recovery VM). The resulting changes made to the ancillary VM 124 during this simulated recovery process are saved to a delta disk 125. The delta disk 125 may be saved to a "hot" data store 134 of the disaster recovery platform 130 for a quick disaster recovery in the future.

Figure 2:
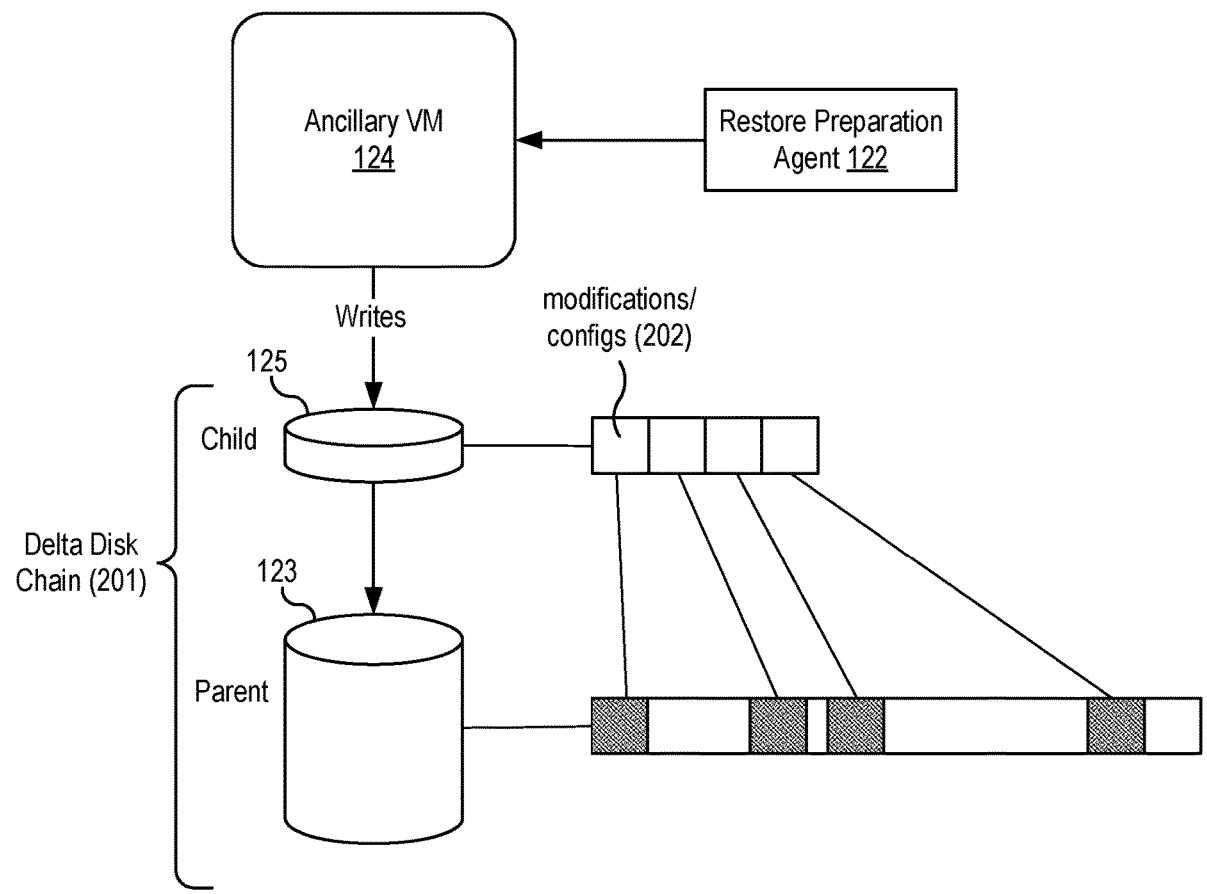
FIG. 2 is a block diagram depicting operations of a restore-preparation agent in greater detail, according to an exemplary aspect.

FIG. 2 is a block diagram depicting operations of the restore-preparation agent 122 is greater detail, according to an aspect. As shown, the restore-preparation agent 122 may be configured to instantiate a (temporary) VM as the ancillary VM 124 for performing the restore-preparation process, and upon completion of this process, remove the VM. The ancillary VM 124 may have a virtual disk 123 that is emulated from one of the backup archives.

In one aspect, restore-preparation agent 122 may generate a delta disk 125 linked to the virtual disk 123 of the ancillary VM. The delta disk 125 and base virtual disk 123 form a delta disk chain 201, where the base virtual disk 123 is a "parent", and the delta disk 125 is a "child" disk. In some aspects, the delta disk (also referred to as a snapshot, child disk, redo log, or delta link) may be created using one or more VM management functions provided by a hypervisor or VM management console. In one implementation, the ancillary VM is given read-only access to the base disk 123 and write access to the delta disk 125.

The restore-preparation agent 122 modifies one or more configurations 202 of the ancillary VM as part of a restore-preparation process that readies a VM that is run from a backup archive. The restore-preparation process disassociates the backup data from hardware dependencies while still retaining any necessary system data (e.g., files, configurations, applications, operating system, etc.). In one aspect, the restore-preparation process includes a dissimilar hardware restoration process that reconciles at least one difference between hardware of the computing device 102 and virtual hardware of the VM (in this case, the ancillary VM). That is, the dissimilar hardware restoration algorithm is configured to fix guest operating system boot-ability, etc., after being restored to dissimilar hardware as the original computing device 102. In one aspect, the modifications include changes to a hardware abstraction layer (HAL) that interacts between the hardware and the rest of the operating system, for example, such as the Windows HAL library (e.g., HAL.dll).

In one aspect, the restore-preparation process involves modifying the ancillary VM to enable the VM to boot using the virtual disk that is emulated from the backup. In some aspects, the restore-preparation process may add and/or modify at least one device driver in the virtual disk of the ancillary VM 124 associated with the backup. The restore-preparation agent 122 may detect the machine type or, in the case of the ancillary VM 124, a virtual machine type, as a VM having one virtual x86 CPU, 2 GBs of RAM, etc. Then, the restore-preparation agent 122 installs one or more drivers appropriate for the hardware abstraction layer associated with the detected machine type. In one aspect, the restore-preparation agent 122 may fix machine boot-ability of the ancillary VM by patching a system boot loader, and converting disks from MBR (master boot record) format to EFI (if needed). For example, the restore-preparation agent 122 may install boot device drivers (e.g., hardware or RAID controller drivers) on the ancillary VM 124, such that the guest OS can boot from the emulated disk. In another example, the restore-preparation agent 122 may install, on the ancillary VM, a network interface controller (NIC) driver associated with the virtual NIC of the ancillary VM 124. In yet another example, the restore-preparation agent 122 may detect hard disk controllers (e.g., SCSI and IDE) of the ancillary VM and install one or more device drivers or tools on the virtual disk. In other aspects, the restore-preparation agent 122 may even disable potentially conflicting services (e.g., Windows® system services) within the ancillary VM. An example restore-preparation process may be Acronis Universal Restore™ technology found in Acronis Backup® made available by Acronis International GmbH.

These modifications 202 to the ancillary VM are saved to the delta disk 125 (rather than the emulated base disk 123). In other words, the delta disk 125 represents the difference between the current state of the virtual disk (i.e., prepared for recovery) and the state of the virtual disk at the time of creation of the backup 112. In some aspects, sectors in the delta disk 125 correspond with sectors in the base disk 123 which they replace or modify.

Referring now to FIG. 1B, the disaster recovery virtualization platform may be configured to (e.g., in response to a request) perform disaster recovery of the computing device 102 and/or of a protected application 104 executing thereon. For example, as shown, the recovery agent 132 may have detected that the physical server 102 has suffered a failure due to hardware issues, and automatically initiate the disaster recovery process. In another example, the recovery agent 132 may initiate the disaster recovery process in response to user input from a system management console, for example, from a system administrator.

The recovery agent 132 creates a recovery VM 152 in a powered-off state that is run from the backup archive 112 provided by the backup system 110. The created recovery VM 152 has a same or similar virtual hardware configuration as the ancillary VM 124 such that the prepared changes made by the restore-preparation on the ancillary VM 124 still also apply to the recovery VM 152. Then, the recovery agent 132 changes the recovery VM's configuration and adds the (earlier) prepared delta disk 125 to the virtual machine disk chain. As such, it is noted that during the actual recovery process, the full stack algorithm is not executed in this case. Finally, the recovery VM 152 is started, for example, in another computing device 102A, and can continue executing any workloads using a copy of the protected application 104A and a copy of the (guest) operating system 106A.

Figure 3:
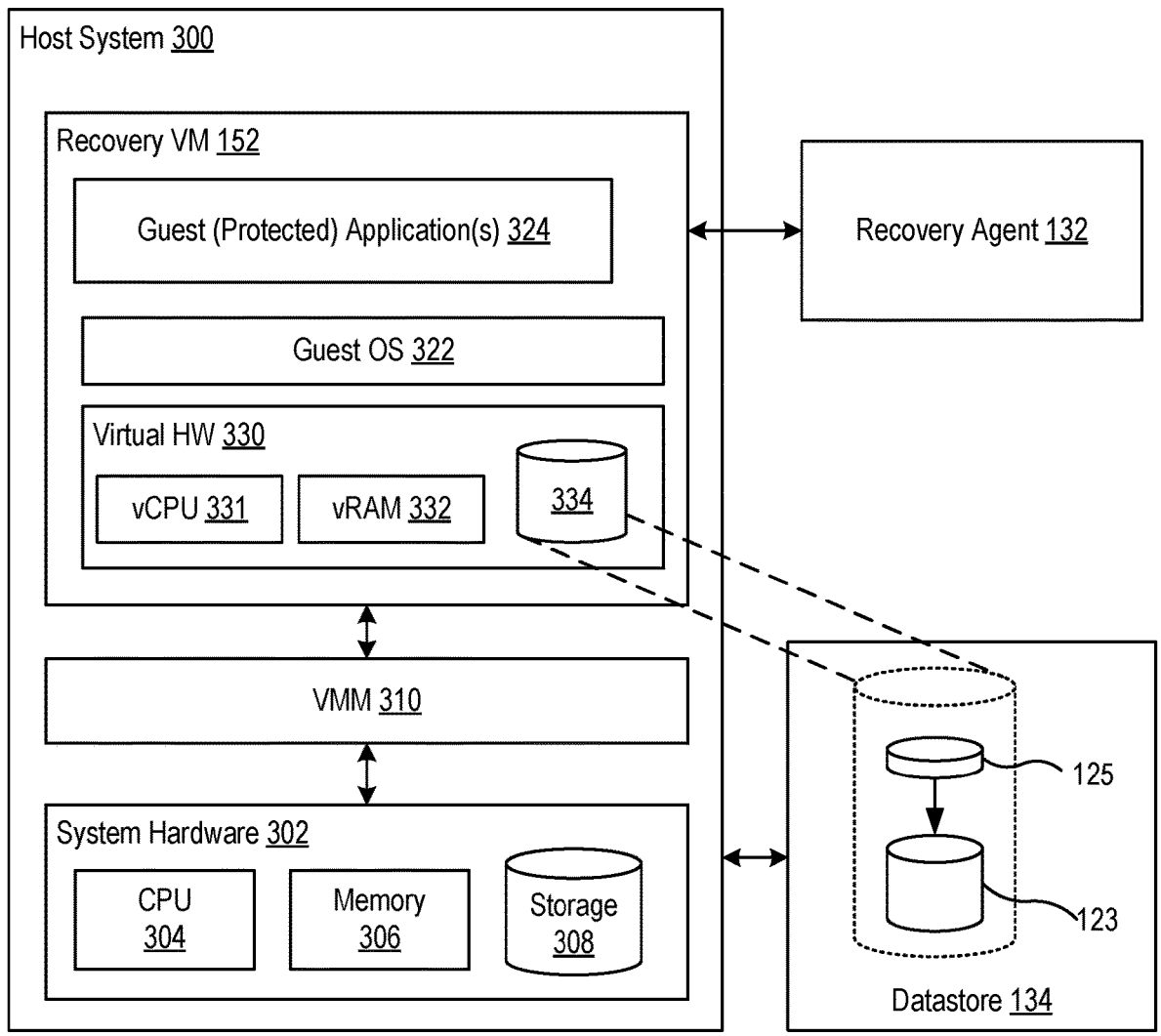
FIG. 3 is a block diagram illustrating a host system for executing a recovery VM, according to an exemplary aspect.

FIG. 3 is a block diagram illustrating a host system 300 for executing a recovery VM, according to an exemplary aspect. The host system 300 may be any computing device, physical server, computer server, desktop, laptop, handheld device, tablet device, smartphone, or any other electronic device suitable for implementing virtualization as described herein.

As shown, the host system 300 may be configured to execute one or more virtual machines (such as the recovery VM 152) on a host platform that includes system hardware 302 and a virtual machine monitor 310 (also known as a hypervisor or a virtualizer). The virtual machine monitor 310 (hereinafter referred to as "VMM 310") provides a guest operating system 322 of the virtual machine with a virtual operating platform (depicted as virtual hardware 330) and manages execution of the guest OS 322. The VMM 310 may run directly on the underlying system hardware 302 or as an application or component running within a host operating system (not shown) installed on the system hardware 302.

The system hardware 302 of a host can include at least one computer processing unit (CPU) 304, memory 306 (e.g., random access memory), and storage devices 308 (e.g., hard disk drives). The host system 300 may include additional devices, software modules, and the like, as would be appreciated to one skilled in the art, but are not shown herein so as to not unnecessarily obscure the aspects of the disclosure. As software, the code for the VM will typically execute on the actual system hardware 302.

In the exemplary aspect, the virtual machine (e.g., recovery VM 152) has both virtual system hardware 330 and guest system software, including the guest OS 322. The virtual system hardware 330 can include a virtual CPU 331, virtual memory 332, a virtual disk 334, as well as other virtual hardware components, such as a virtual network interface. It is noted that all of the virtual hardware components of the virtual machine can be implemented in software to emulate corresponding physical components, for example, using a virtual device emulator module.

The guest OS 322 may be configured to support execution of the guest application 324. A guest application 324 may be a running instance of program code that is part of the protected application 104. The VMM 310 acts as the interface between guest software executing within the VM, including one or more guest processes 324 and guest OS 322, and the hardware components and devices in the underlying system hardware platform 302 of the host machine.

In one aspect, the host system 300 may be communicatively connected to the data store 134 configured to store one or more delta disks 125, base disks 123, and other virtual disks associated with the VMs executing on the host system 300.

In one aspect, the recovery agent 132 is configured to instantiate a recovery VM 152 having a base virtual disk 123 emulated from a backup archive 112. The created recovery VM 152 may have a same or similar virtual hardware configuration as the ancillary VM 124 such that the prepared changes made by the restore-preparation on the ancillary VM 124 still also apply to the recovery VM 152. For example, if the ancillary VM 124 was configured to have a certain vCPU (e.g., architecture, number of cores, certain CPU features enabled), the recovery VM 152 is created with the same vCPU. In another example, the recovery VM 152 may be configured with the same virtual storage device type (e.g., SCSI), network interface controller (NIC), and parallel and serial port configurations, and memory configuration, as the ancillary 124.

The recovery agent 132 may modify the recovery VM 152 by attaching the delta disk 135 having the one or more modifications and/or configurations for executing the protected application 324. As a result, the virtual disk 334 of the recovery VM 152 is backed by a delta disk chain comprised of the prepared delta disk 125 (as the child) and the base virtual disk 123 emulated from the backup archive 112 (as the parent). To complete the process, the recovery agent 132 may power on and resume execution of the protected application 324 on the recovery VM 152.

While the host system 300 is discussed in context of a recovery VM, it is understood that a similar host system may be used in executing the ancillary VM 124 and generating the delta disk 125 as described above. Moreover, in general, it should be appreciated that the disclosed system and method is described herein in the context of a hosted virtualized computing system. However, in alternative aspects, the system and method may be implemented for a non-hosted virtualized computer system, and may also be implemented directly in a computer's primary OS, both where the OS is designed to support virtual machines and where the OS does not support virtual machines.

In another aspect of the present disclosure, the described technique may be extended to perform disaster recovery using backups of a virtual machine executing a protected application (i.e., not just physical machines). This may be useful to recover a workload in situations of cross-platform or cross-version recovery. That is, the original VM was backed up from a different virtualization platform or an older version of a similar platform than the resulting recovery VM. In such a case, the described technique may be used to prepare a delta disk that provides boot-ability fixes to support the target virtualization platform.

For example, the recovery-preparation agent 122 may receive a backup of a first VM executing the protected application, where the first VM is supported by a first virtualization platform, such as an Hyper-V VM made available by Microsoft, Inc. The recovery-preparation agent 122 may generate an ancillary VM having a virtual disk emulated from the backup. The ancillary VM has a different format than the first VM, such as being supported by a different virtualization platform, e.g., ESX VMware, or by a different (and possibly incompatible) version of Hyper-V VM. The recovery-preparation agent 122 may generate a delta disk, which is linked to the virtual disk of the ancillary VM, that includes changes made to the ancillary VM to permit the ancillary VM to be booted using the backup from the first VM. During recovery, the recovery agent 132 fails over to a recovery VM 152 similar to the ancillary VM in that it may be a cross-platform or cross-version recovery in relation to the first VM.

Figure 4:
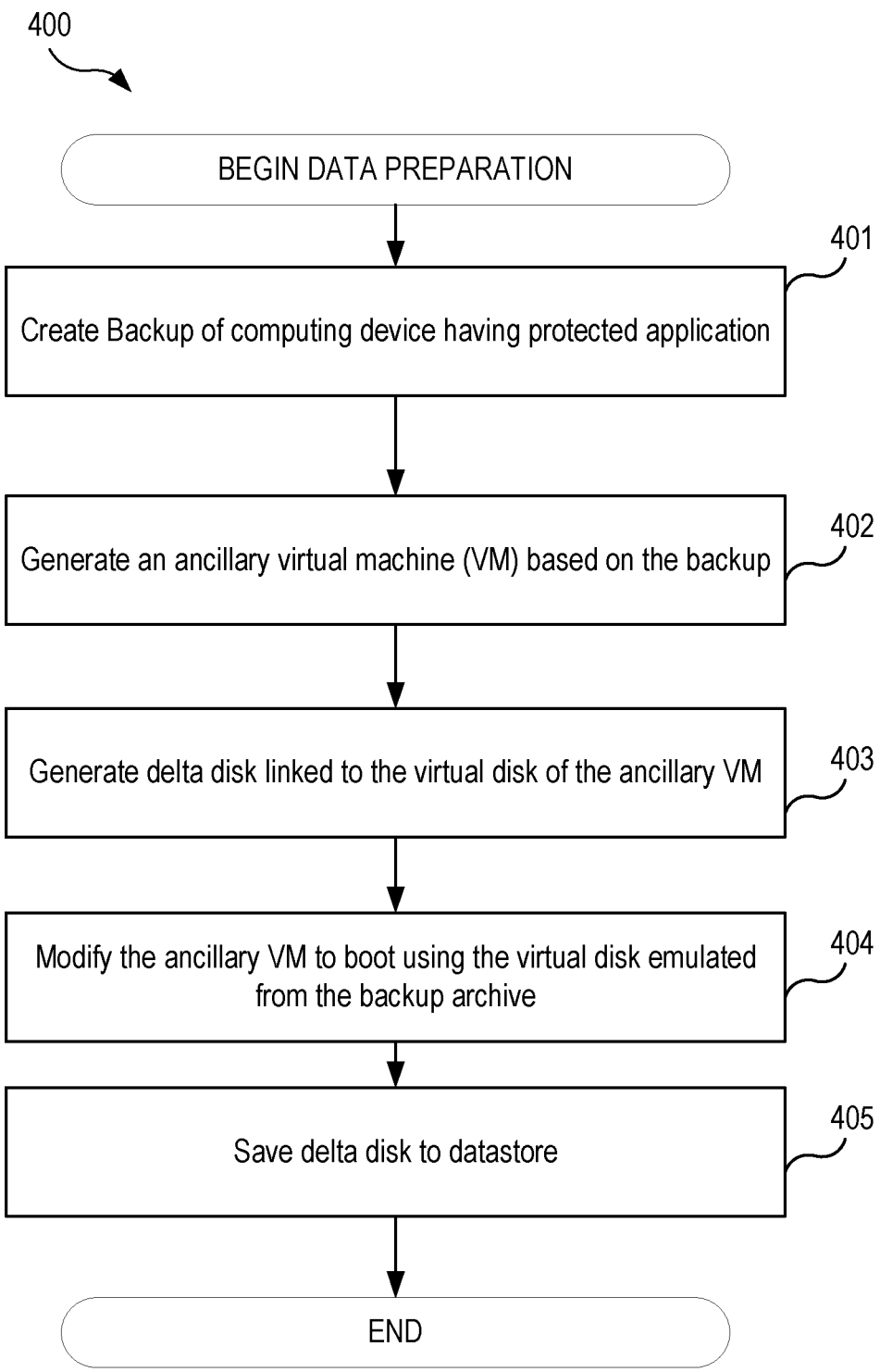
FIG. 4 is a flowchart illustrating a method 400 for creating a prepared delta disk for disaster recovery according to an exemplary aspect.

FIG. 4 is a flowchart illustrating a method 400 for creating a prepared delta disk for disaster recovery according to an exemplary aspect. It is noted that the following description of the exemplary method makes reference to the system and components described above.

The method 400 begins at step 401, in which the backup system 110 creates a backup of a computing device 102 executing one or more protected applications 104. At step 402, the restore-preparation agent 122 generates an ancillary virtual machine 124 based on the backup. The ancillary VM includes a virtual disk that is emulated from the backup. At step 403, the restore-preparation agent 122 may generate a delta disk linked to the virtual disk of the ancillary VM. At step 404, the restore-preparation agent 122 may modify the ancillary VM to boot using the virtual disk that is emulated from the backup. The modifications to the ancillary VM may be saved to the delta disk. In some aspects, the restore-preparation process is performed by background processing that is off-site from a backup system that created the backup of the computing device. In some aspects, the restore-preparation process includes a dissimilar hardware restoration process configured to reconcile at least one difference between hardware of the computing device and virtual hardware of the recovery VM. In some aspects, the restore-preparation process modifies at least one device driver in the virtual disk of the ancillary VM associated with the backup. At step 405, the restore-preparation agent 122 saves the delta disk to a data store 134.

Figure 5:
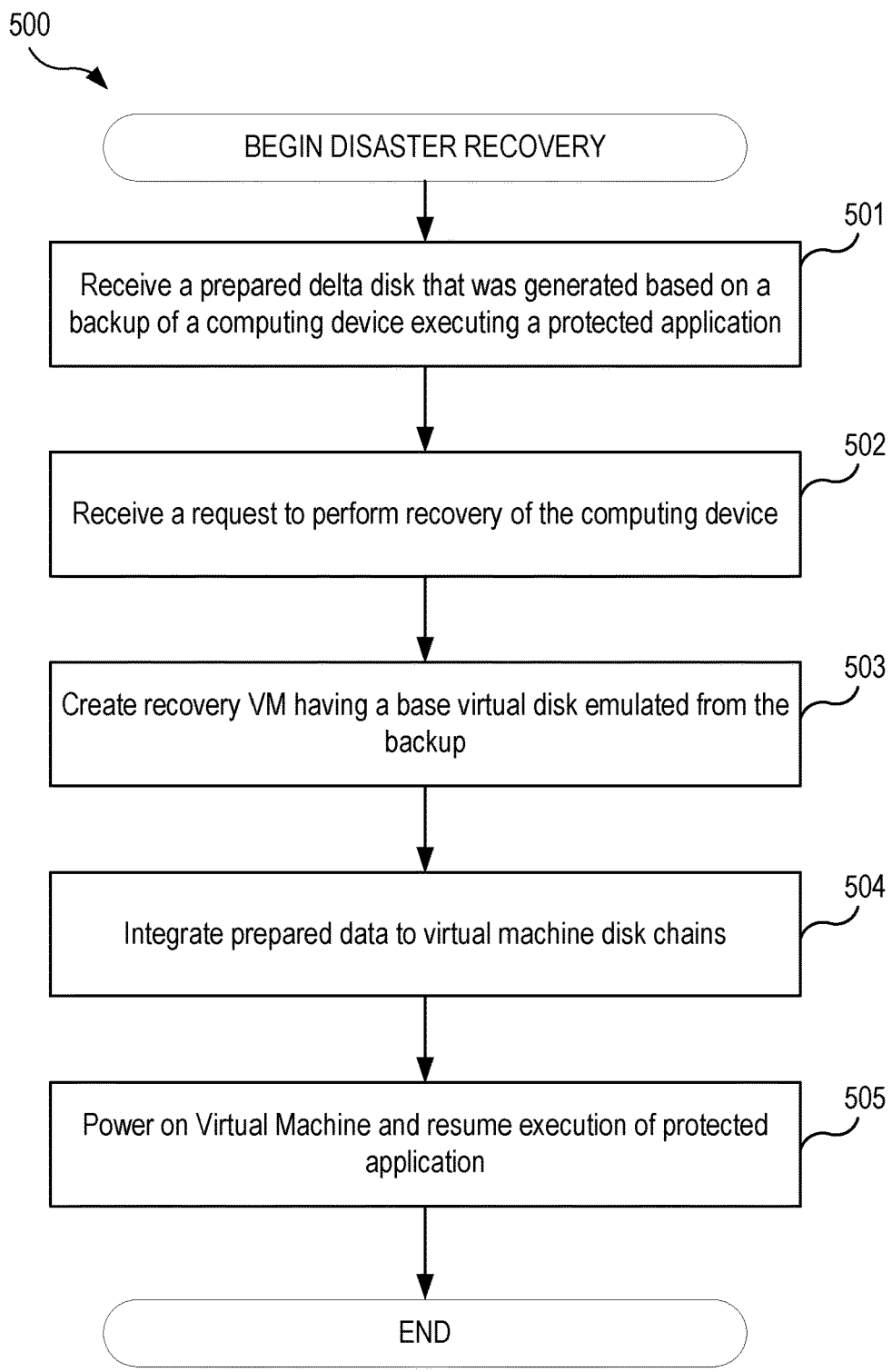
FIG. 5 is a flowchart illustrating a method for restoring a computing system according to an exemplary aspect.

FIG. 5 is a flowchart illustrating a method 500 for restoring a computing system according to an exemplary aspect. It is noted that the following description of the exemplary method makes reference to the system and components described above.

The method 500 begins at step 501, in which a recovery agent 132 receives a delta disk that was generated based on a backup of a computing device executing a protected application. The delta disk includes one or more configurations for executing the protected application on a different device than the computing device. In some aspects, the delta disk may be generated prior to receiving a request to perform disaster recovery of the computing device. In some aspects, the delta disk may be generated by a restore-preparation process, such as the method 400 described in FIG. 4 above. In some aspects, the delta disk comprises recovery-prepared data and occupies less storage space than a virtual disk file associated with a virtual machine converted from the backup (i.e., from a "convert to VM" approach).

At step 502, the recovery agent 132 receives a request to perform recovery of the computing device. In response, at step 503, the recovery agent 132 creates a recovery virtual machine (VM) having a base virtual disk emulated from the backup. At step 504, the recovery agent 132 integrates the prepared data to virtual machine disk chains by modifying the recovery VM to attach the delta disk having the one or more configurations for executing the protected application. In one aspect, the recovery agent 132 creates a delta disk chain comprising the base virtual disk of the recovery VM as a parent disk, and the delta disk as a child disk of the base virtual disk. At step 505, the recovery agent 132 powers on the recovery VM and resumes execution of the protected application on the recovery VM.

Figure 6:
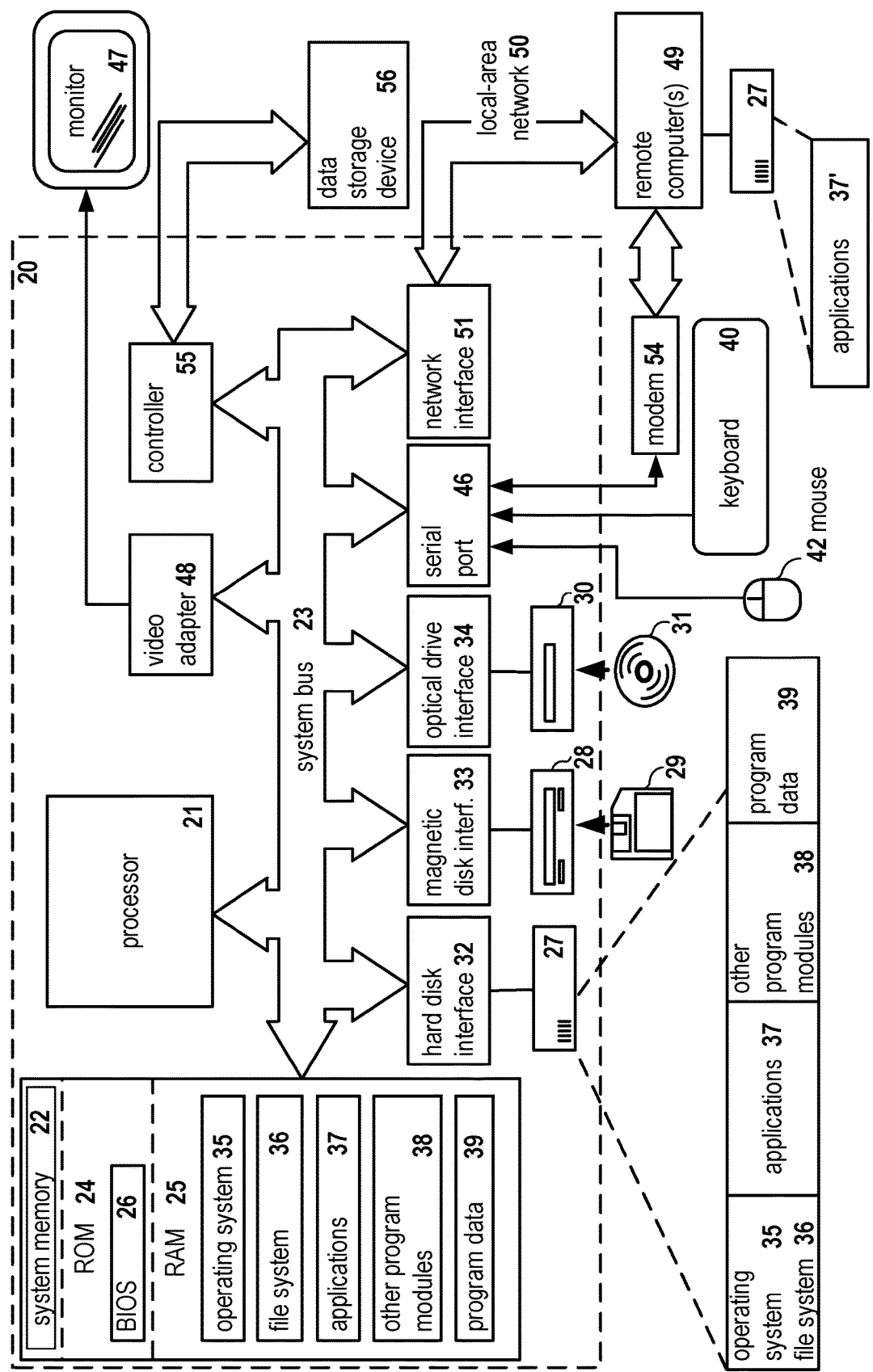
FIG. 6 is a block diagram of a general-purpose computer system on which the disclosed system and method can be implemented according to an exemplary aspect.

FIG. 6 is a block diagram illustrating a general-purpose computer system 20 on which aspects of systems and methods for restoring a computing system may be implemented in accordance with an exemplary aspect. It should be noted that the computer system 20 can correspond to the computing device 102, the disaster recovery virtualization platform 130, the data processing platform 120, and host system 300, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 6, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for restoring a computing device, comprising:
   emulating a virtual disk using a backup of the computing device;
   generating an ancillary virtual machine (VM);
   determining and writing, to a delta disk linked to the virtual disk, configuration modifications to the ancillary VM that enable booting of the ancillary VM using the virtual disk on a different device with dissimilar hardware as the computing device;
   responsive to receiving a request to perform recovery of the computing device, restoring the backup by:
      creating on the different device a recovery virtual machine (VM) having a base virtual disk emulated from the backup; and
      modifying the recovery VM by attaching the delta disk having the configuration modifications.

2. The method of claim 1, wherein the ancillary VM is given read-only access to the virtual disk and write access to the delta disk.

3. The method of claim 1, further comprising deleting the generated ancillary VM when writing the configuration modifications on the delta disk is complete.

4. The method of claim 1, wherein the backup comprises a protected application, and wherein the configuration modifications enable execution of the protected application on the different device.

5. The method of claim 4, further comprising executing the protected application on the recovery VM.

6. The method of claim 1, wherein modifying the recovery VM by attaching the delta disk further comprises:
   creating a delta disk chain comprising the base virtual disk of the recovery VM as a parent disk, and the delta disk as a child disk of the base virtual disk.

7. The method of claim 1, wherein the delta disk is generated by a restore preparation process, further comprising prior to receiving the request to perform the recovery of the computing device, saving the delta disk to a data store.

8. The method of claim 7, wherein the restore-preparation process is performed by background processing that is off-site from a backup system that created the backup of the computing device.

9. The method of claim 7, wherein the restore-preparation process comprises a dissimilar hardware restoration process configured to reconcile at least one difference between hardware of the computing device and virtual hardware of the ancillary VM.

10. The method of claim 7, wherein the restore-preparation process modifies at least one device driver in the virtual disk of the ancillary VM associated with the backup.

11. The method of claim 1, wherein the delta disk associated with the backup occupies less storage space than a virtual disk file associated with a virtual machine converted from the backup.

12. A system for restoring a computing system, comprising:
   a storage device, and
   a hardware processor configured to:
      emulate a virtual disk using a backup of the computing device;
      generate an ancillary virtual machine (VM);
      determine and write, to a delta disk linked to the virtual disk, configuration modifications to the ancillary VM that enable booting of the ancillary VM using the virtual disk on a different device with dissimilar hardware as the computing device;
      responsive to receiving a request to perform recovery of the computing device, restore the backup by:
         creating on the different device a recovery virtual machine (VM) having a base virtual disk emulated from the backup; and
         modifying the recovery VM by attaching the delta disk having the configuration modifications.

13. The system of claim 12, wherein the ancillary VM is given read-only access to the virtual disk and write access to the delta disk.

14. The system of claim 12, wherein the hardware processor is further configured to delete the generated ancillary VM when writing the configuration modifications on the delta disk is complete.

15. The system of claim 12, wherein the backup comprises a protected application, and wherein the configuration modifications enable execution of the protected application on the different device.

16. The system of claim 15, wherein the hardware processor is further configured to execute the protected application on the recovery VM.

17. The system of claim 12, wherein the hardware processor is further configured to modify the recovery VM by attaching the delta disk by:
   creating a delta disk chain comprising the base virtual disk of the recovery VM as a parent disk, and the delta disk as a child disk of the base virtual disk.

18. The system of claim 12, wherein the delta disk is generated by a restore preparation process, wherein the hardware processor is further configured to, prior to receiving the request to perform the recovery of the computing device, save the delta disk to a data store.

19. The system of claim 18, wherein the restore-preparation process 1s performed by background processing that is off-site from a backup system that created the backup of the computing device.

20. A non-transitory computer readable medium comprising computer executable instructions for restoring a computing device, including instructions for:
   emulating a virtual disk using a backup of the computing device;
   generating an ancillary virtual machine (VM);
   determining and writing, to a delta disk linked to the virtual disk, configuration modifications to the ancillary VM that enable booting of the ancillary VM using the virtual disk on a different device with dissimilar hardware as the computing device;
   responsive to receiving a request to perform recovery of the computing device, restoring the backup by:

creating on the different device a recovery virtual machine (VM) having a base virtual disk emulated from the backup; and modifying the recovery VM by attaching the delta disk having the configuration modifications.

* * * * *